(12) United States Patent
Breuning (10) Patent No.: US 11,642,826 B2
(45) Date of Patent: May 9, 2023

(54) LAMELLA BLOCK WITH LATERALLY OFFSET LAMELLAE

(71) Applicant: KRAUSSMAFFEI TECHNOLOGIES GMBH, Munich (DE)

(72) Inventor: Walter Breuning, Bergkirchen (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 0 days.

(21) Appl. No.: 17/434,907

(22) PCT Filed: Feb. 13, 2020

(86) PCT No.: PCT/EP2020/053698
§ 371 (c)(1),
(2) Date: Aug. 30, 2021

(87) PCT Pub. No.: WO2020/187496
PCT Pub. Date: Sep. 24, 2020

(65) Prior Publication Data
US 2022/0055278 A1 Feb. 24, 2022

(30) Foreign Application Priority Data
Mar. 21, 2019 (DE) .................... 10 2019 002 022.7

(51) Int. Cl.
*B29C 48/09* (2019.01)
*B33Y 50/00* (2015.01)
(Continued)

(52) U.S. Cl.
CPC .............. *B29C 48/09* (2019.02); *B22F 10/31* (2021.01); *B22F 10/43* (2021.01); *B22F 10/85* (2021.01);
(Continued)

(58) Field of Classification Search
CPC ..... B29C 48/12; B29C 48/908; B29C 48/904; B29C 48/907; B29C 48/88; B29C 48/901; B29C 48/903; B33Y 50/00; B33Y 80/00
See application file for complete search history.

(56) References Cited

U.S. PATENT DOCUMENTS

2003/0211657 A1 11/2003 Wiliams et al.
2006/0034965 A1 2/2006 Ulrich et al.
(Continued)

FOREIGN PATENT DOCUMENTS

DE 19843340 C2 11/2001
DE 10315125 B3 9/2004
(Continued)

OTHER PUBLICATIONS

Isaza et al., "Additive Manufacturing with metal powders: Design for Manufacture evolves into Design for Function," Metal Additive Manufacturing, Summer 2014, 6 pages.
(Continued)

*Primary Examiner* — Larry W Thrower
(74) *Attorney, Agent, or Firm* — Pearne & Gordon LLP (57) ABSTRACT

A lamella block is provided for a calibrating device for calibrating an extruded profile, wherein the lamella block includes a carrier structure and a lamella structure, and wherein the lamella structure has a plurality of lamellae, which are spaced apart from each other by grooves and arranged in a longitudinal direction (L) of the carrier structure. Neighboring lamellae of the lamella block are arranged laterally offset to each other in the longitudinal direction (L). Also provided is a method for manufacturing the lamella block mentioned above, as well as a calibrating device, which includes a plurality of the lamella blocks mentioned above. Further provided is a system for additively manu-
(Continued)

facturing the lamella block mentioned above, a corresponding computer program and a corresponding dataset.

7 Claims, 8 Drawing Sheets

(51) Int. Cl.
    *B33Y 80/00*     (2015.01)
    *B29C 48/90*     (2019.01)
    *B22F 10/43*     (2021.01)
    *B22F 10/31*     (2021.01)
    *B22F 10/85*     (2021.01)
    *B29C 48/12*     (2019.01)
    *B22F 10/28*     (2021.01)
    *B22F 12/00*     (2021.01)
    *B22F 12/50*     (2021.01)

(52) U.S. Cl.
    CPC .......... *B29C 48/903* (2019.02); *B29C 48/904* (2019.02); *B29C 48/907* (2019.02); *B29C 48/908* (2019.02); *B33Y 50/00* (2014.12); *B33Y 80/00* (2014.12); *B22F 10/28* (2021.01); *B22F 12/226* (2021.01); *B22F 12/50* (2021.01); *B29C 48/12* (2019.02)

(56) References Cited

U.S. PATENT DOCUMENTS

2006/0071372 A1*   4/2006   Stieglitz ................ B29C 48/903
                                                             425/71
2006/0159796 A1    7/2006   Schmuhl et al.
2006/0240134 A1   10/2006   Stieglitz

FOREIGN PATENT DOCUMENTS

DE       102005002820 B3    5/2006
DE       102009016100 A1   10/2010
WO      2004103684 A1   12/2004

OTHER PUBLICATIONS

International Search Report for International Application No. PCT/EP2020/053698 dated May 27, 2020.

International Preliminary Report on Patentability for International Application No. PCT/EP2020/053698 dated Jun. 10, 2021.

\* cited by examiner

Fig. 1

-- PRIOR ART --

LAMELLA BLOCK WITH LATERALLY OFFSET LAMELLAE

CROSS-REFERENCE TO RELATED APPLICATIONS

This is a National Stage application of PCT international application PCT/EP2020/053698 filed on Feb. 13, 2020, which claims the priority of German Patent Application No. 10 2019 002 022.7, filed Mar. 21, 2019, which are incorporated herein by reference in their entireties.

FIELD OF THE INVENTION

The invention relates to a lamella block for a calibrating device for calibrating an extruded profile. The invention further relates to a method for manufacturing such a lamella block, a system for additively fabricating such a lamella block, and a corresponding computer program and dataset.

BACKGROUND OF THE INVENTION

Calibrating devices are used for calibrating extruded endless profiles, for example such as pipe profiles. During the manufacture of such profiles, a polymer melt desired for manufacturing the profile is first generated in an extruder. The generated polymer melt is then pressed through an outlet nozzle of the extruder, which prescribes the shape of the profile. The profile exiting the outlet nozzle of the extruder then runs through a calibrating device, which copies the still heated profile in a dimensionally accurate manner.

Such a calibrating device for dimensioning extruded profiles is known from DE 198 43 340 C2. Taught therein is a variably adjustable calibrating device, which is designed to calibrate extruded plastic pipes with a varying pipe diameter. The calibrating device comprises a housing and a plurality of lamella blocks circularly arranged in the housing, the lamellae of which can intermesh. The intermeshing lamellae form a calibrating basket with a circular calibrating opening, through which the pipes to be calibrated are guided (see in particular FIGS. 1 and 2 of DE 198 43 340 C2). During the calibration process, a negative pressure acts on the pipe profile from outside. The negative pressure sucks the outer walls of the pipe profile against the lamellae of the lamella blocks. Each lamella block is coupled with an activating device, which is provided for individually radially displacing the respective lamella block. In this way, the active cross section of the circular calibrating opening formed by the plurality of lamella blocks can be correspondingly adjusted as needed.

DE 10 2009 016 100 A1 relates to a calibration device for a system for extruding plastic pipes, comprising calibration tools that abut the outer wall of the pipe during calibration, wherein a plurality of segmented calibration tools are distributed over the periphery of the pipe to be calibrated with their respective midpoints spaced apart from each other, and each form an annular arrangement, and wherein a plurality of such annular arrangements are provided as viewed in the direction of pipe production, wherein the individual tools of two annular arrangements that follow each other in the longitudinal direction are each offset relative to each other in the peripheral direction, and the segmented tools of the ring that immediately follows in the longitudinal direction each engage into the gap between the tools of a ring and the next but one ring, so that a toothed arrangement comes about. The invention provides that the individual segmented calibration tools extending in a peripheral direction be designed as a hollow body, and have slits in the area of their sliding surfaces that abut the pipe periphery, which are connected with a cavity in the hollow body. As a result, water or a vacuum can be applied to the pipe surface via the slits.

DE 103 15 125 B3 relates to a calibration device for calibrating extruded endless profiles, in particular pipes, comprising a plurality of segment rings arranged one after the other that consist of individual segments, the inner surfaces of which together form a calibration opening.

DE 10 2005 002 820 B3 relates to an infinitely variable calibration sleeve for extruded plastic pipes with an inlet head and two tape layers, which cross each other like a scissor grid and are hinged together at the crossing points.

US 2003/211 657 A1 discloses a heatsink fabricated via stereolithography. When stereolithographic methods are used to manufacture the heat dissipation element of the heatsink, the heat dissipation element can have nonlinear or winding passages through which air can flow. Since at least one part of the heatsink is manufactured via stereolithography, this part can have a series of superimposed, coherent layers of thermally conductive material adhering to each other. The layers can be manufactured using consolidated, selected areas of a layer comprised of unconsolidated particulate or powder material, or by defining an object layer from a material layer.

Figure 1:
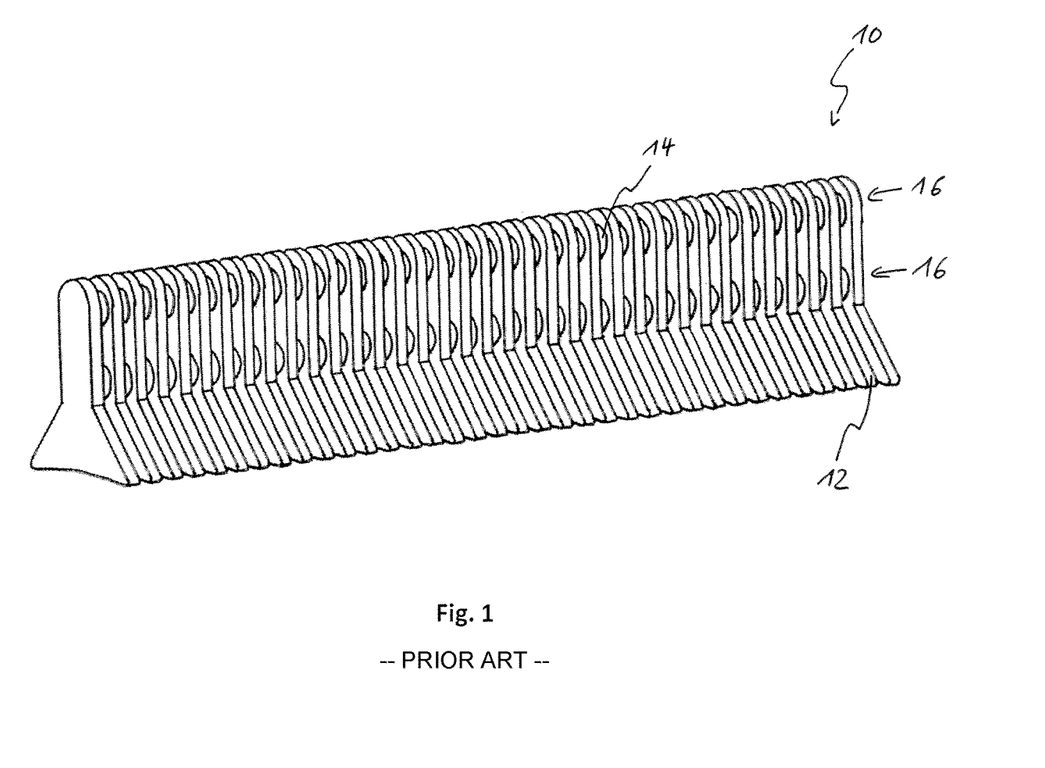
FIG. 1 is a 3D view of a lamella block for a calibrating device according to prior art.

The lamella blocks described in DE 198 43 340 C2 each consist of a plurality of lamellae, which are threaded onto two spaced apart carrier rods. Spacer sleeves are used to maintain a desired distance between neighboring lamellae (see also FIG. 3 of DE 198 43 340 C2). An example for a threaded lamella block is further shown on FIG. 1. The lamella block 10 shown on FIG. 1 comprises a plurality of lamellae 12 and spacer sleeves 14, which are alternatingly threaded along two carrier rods 16. Such threaded lamella blocks are complicated to manufacture, and thus cost-intensive.

Figure 2A:
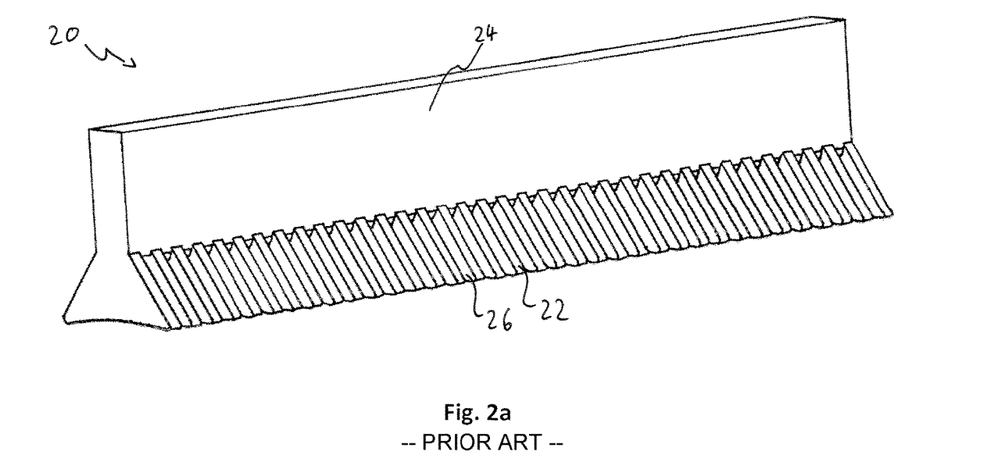
FIG. 2a-2c are views of another lamella block for a calibrating device according to prior art.
Figure 2B:
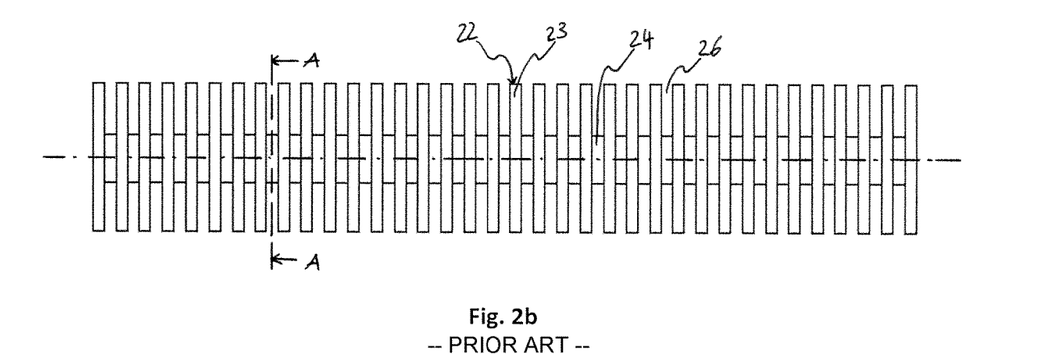
Figure 2C:
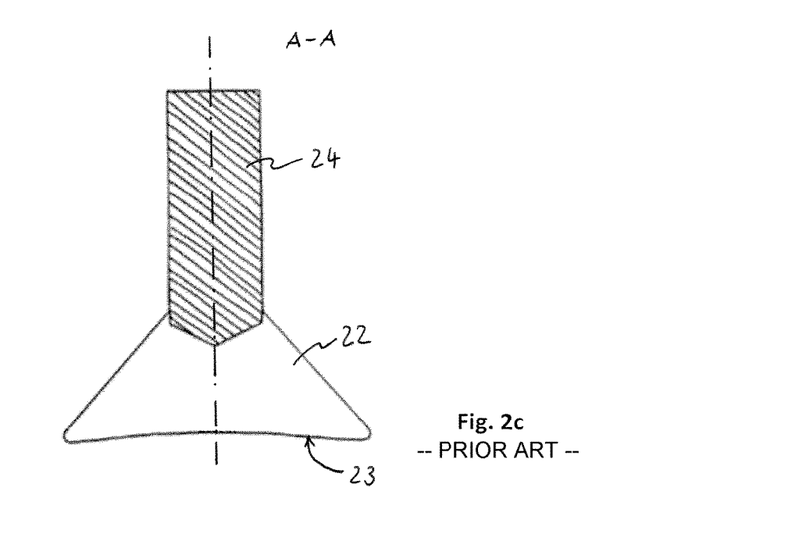

Also known apart from the threaded lamella blocks described above are lamella blocks with closed carrier structures (or back structures). FIGS. 2a, 2b and 2c show an example of such a lamella block. The lamella block 20 comprises a plurality of lamellae 22, which are carried by a back structure 24 (see 3D view on FIG. 2a). The block-shaped carrier structure 24 is here realized in the form of a massive body (e.g., a rod-shaped body). Additional examples of lamella blocks with a closed back structure are known from WO 2004/103684 A1. Such lamella blocks can be integrally designed. They can be cost-effectively manufactured out of a material block via suitable machining operations (such as milling, cutting to size). However, it is also conceivable to use a casting process to manufacture the lamella block 20.

The lamellae 22 of the lamella block 20 are arranged sequentially along a straight line along the longitudinal direction of the carrier structure 24 (see FIG. 2b). This means that contact surfaces 23 of the individual lamellae 22 that come into contact with the outer surface of the profile to be calibrated during a calibration process produce a straight progression on the inside of the lamella block 20. In addition, the lamellae 22 of the lamella block 20 are identical in shape, and each have an inherently symmetrical cross section transverse to the longitudinal direction of the carrier structure 24 (see FIG. 2c).

Figure 3:
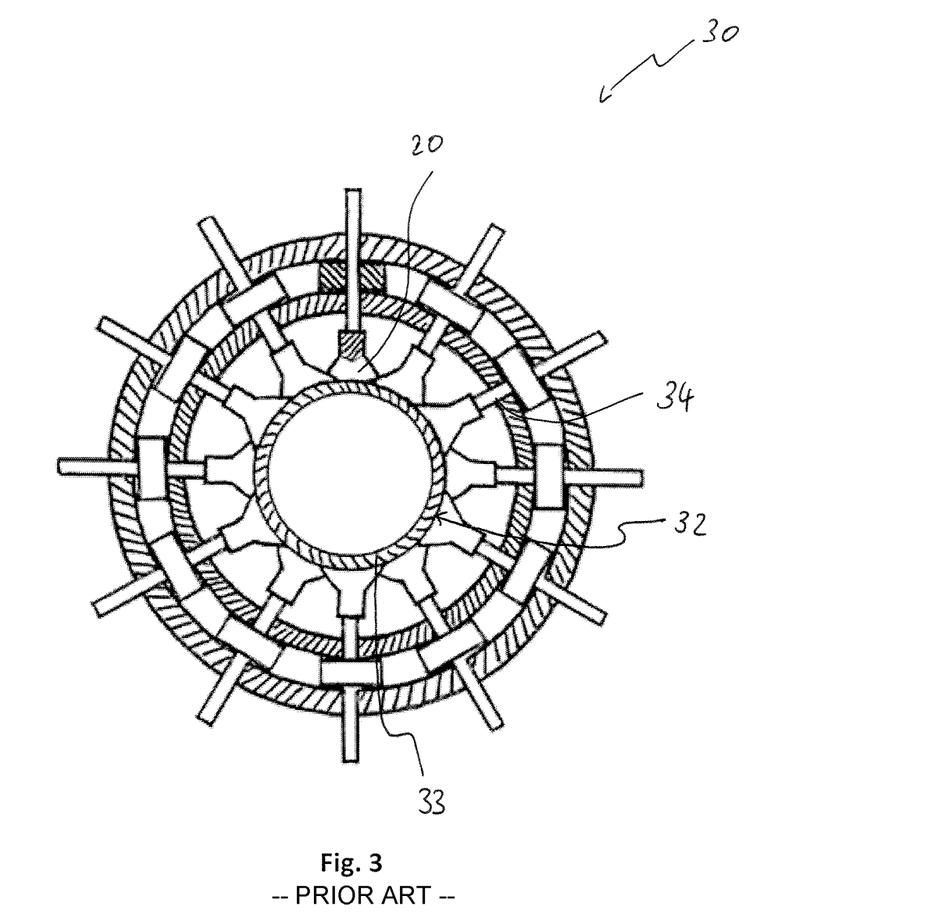
FIG. 3 is a calibrating device according to prior art.

In a state where built into a calibrating device 30, as exemplarily shown on FIG. 3, the lamella blocks 20 are arranged in a peripheral direction relative to a profile 33 to be calibrated, and form a calibrating opening 32. The lamellae 22 of each lamella block 20 here engage into the grooves 26 of the respective neighboring lamella blocks 20, thereby yielding an intermeshing arrangement of lamella blocks 20 overall. The degree to which the lamella blocks 20 engage into each other can be adjusted by activating devices 34, which are each coupled with a lamella block 20, so as to displace the lamella blocks 20 in a radial direction (i.e., perpendicular to the feed direction of the profile 33 to be calibrated). This makes it possible to correspondingly adjust the active cross section of the calibrating opening 32 to the profile 33 to be calibrated. Calibrating devices of the kind depicted on FIG. 3 are also described in DE 198 43 340 C2.

Figure 4A:
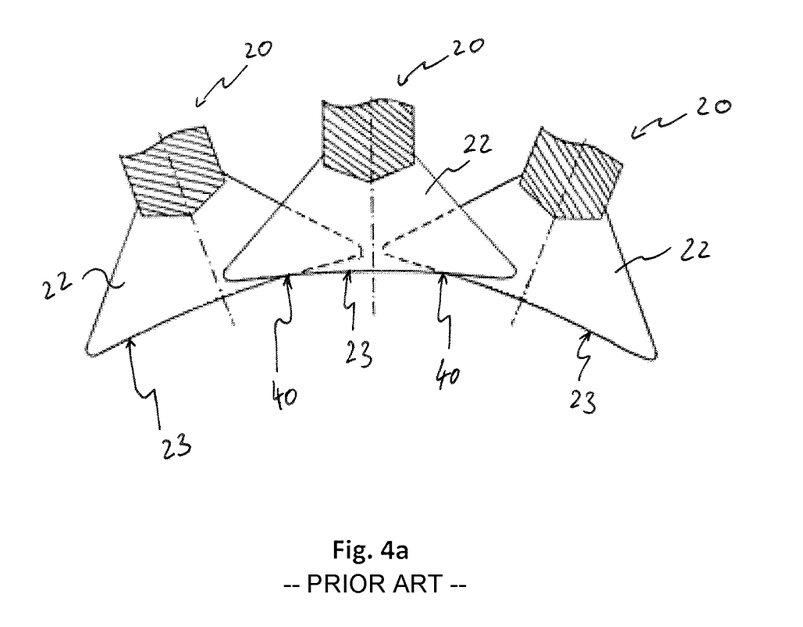
FIG. 4a-4b are schematic views of several intermeshing lamella blocks.

FIG. 4a schematically shows how the lamellae 22 of neighboring lamella blocks 20 engage into each other. As depicted on FIG. 4a, respective intersecting edges 40 arise between the lamella blocks 20. The intersecting edges 40 are edges in the contour of the calibrating opening, which arise from the reciprocally angled contact surfaces 23 of neighboring lamella blocks 20. The active cross section of a calibrating opening for a tubular profile is thus as a rule not exactly circular, but rather has a polygonal shape. The farther apart the lamella blocks 20 are moved from each other, the weaker the intersections 40 between the lamella blocks 20 become.

Figure 4B:
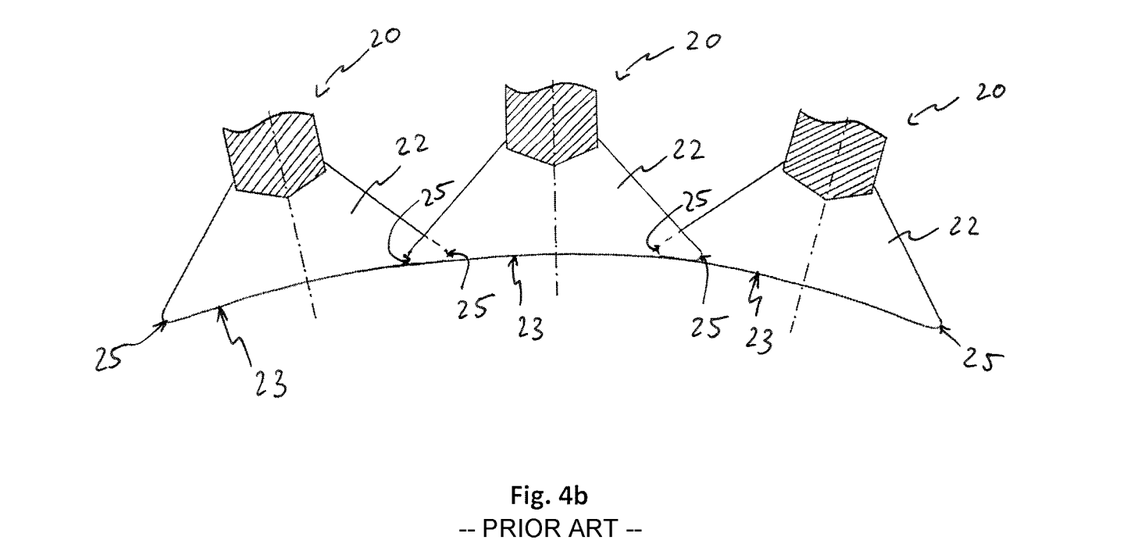

FIG. 4b shows how the lamellae 22 of neighboring lamella blocks 20 engage, wherein the lamella blocks 20 are moved so far apart from each other that the curved contact surfaces 23 of the intermeshing lamellae form a circular active cross section of the calibrating opening, essentially without intersecting edges. In the constellation shown, the lamellae 22 are now only slightly engaged in the grooves of the neighboring lamella blocks 20, wherein the lateral lamella ends 25 of each lamella abut essentially flush with the contact surface 23 of the lamellae 22 of the respectively neighboring lamella blocks. The negative pressure that acts on the profile to be calibrated from outside during the calibration process slightly presses (or sucks) the outer wall of the profile into the grooves of the lamella blocks 20. Imprints on the surface of the outer profile wall arise at locations where the lateral lamella ends 25 of the lamellae 22 protrude into the grooves.

While feeding a profile to be calibrated through the calibrating opening 32 of a calibrating device 30, the imprints generate tracks on the surface of the profile to be calibrated. While calibrating cylindrical profiles (e.g., pipe profiles), the calibrating basket is therefore rotated during calibration, even if the calibrating opening is opened so widely that it produces no intersecting edges 40. The rotation largely eliminates the tracks generated on the surface of the profile. However, rotating the calibrating basket requires a complicated and cost-intensive construction of the calibrating device. The calibrating basket must be suitably mounted and driven. The numerous movable parts in such a construction further require that the calibrating basket be rehoused, so as to limit potential hazards.

BRIEF SUMMARY OF THE INVENTION

The object of the present invention is to provide lamella blocks for a calibrating device, which reduce or eliminate the problems indicated in conjunction with prior art. In particular, the present invention is intended to enable a rotation-free calibration of cylindrical profiles, wherein a high surface quality is achieved for the profiles.

In order to achieve the object mentioned above, one aspect of the invention provides a lamella block for a calibrating device for calibrating an extruded profile. The lamella block comprises a carrier structure and a lamella structure. The lamella structure has a plurality of lamellae, which are spaced apart from each other by grooves, and are arranged in the longitudinal direction of the carrier structure, wherein neighboring lamellae are arranged laterally offset to each other in the longitudinal direction.

The extruded profile can be a plastic profile. The extruded plastic profile can be an endless profile. In particular, the plastic profile can be a pipe profile. Offsetting the lamellae relative to each other results in an arrangement of lamellae fanned in the longitudinal direction. If the lamella block is built into a calibrating device, the longitudinal direction of the carrier structure corresponds to the extruding direction (feed direction) of the profile to be calibrated (that has been extruded).

Each lamella has a contact surface on an interior side of the lamella block. By offsetting the lamellae relative to each other, the lamellae describe a diagonal or wavy progression in relation to the longitudinal direction of the carrier structure. The interior side of the lamella block is the side of the lamella structure that faces way from the carrier structure. Contact surfaces of the lamellae refer to those surfaces which comprise the calibrating opening in a state built into the calibrating device, and which come into contact with the outer surface of the profile to be calibrated. The contact surfaces of the lamellae can also be arranged along the longitudinal direction of the carrier structure to follow a zigzag or other kind of progression.

In one variant, each lamella can have a contact surface on an interior side of the lamella block. Offsetting the lamellae relative to each other allows the lamellae or contact surfaces of the lamellae to describe a diagonal or wavy progression in relation to the longitudinal direction of the carrier structure. The interior side of the lamella block is the side of the lamella structure that faces way from the carrier structure. Contact surfaces of the lamellae refer to those surfaces which comprise the calibrating opening in a state built into the calibrating device, and which come into contact with the outer surface of the profile to be calibrated. The contact surfaces of the lamellae can also be arranged along the longitudinal direction of the carrier structure to follow a zigzag or other kind of progression.

Each lamella can have a cross section transverse to the longitudinal direction of the carrier structure, wherein the cross sections of at least some of the lamellae are inherently asymmetrical. The asymmetry of the lamella cross sections relates to a plane of symmetry of the lamella block that runs perpendicular to the contact surfaces of the lamellae and in a longitudinal direction centrally through the carrier structure. It goes without saying that the contact surfaces in inherently asymmetrical lamellae can preferably also be asymmetrical relative to the plane of symmetry.

In a state built into a calibrating device, the longitudinal direction of the carrier structure can correspond to the feed direction of the profile that has been extruded (is to be calibrated). In other words, the carrier structure of each lamella block of a calibrating device runs parallel to a central axis of the calibrating device.

The carrier structure and the lamellae can be fabricated out of the same material or out of different materials. In particular, the carrier structure and/or the lamellae can consist of a metal material or a polymer material. Alternatively, the carrier structure can comprise at least one carrier rod, along which the individual lamellae of the lamella block are threaded in the longitudinal direction.

The lamella block can be manufactured by means of 3D printing. Alternatively, for example, the lamella block can be manufactured via milling, drilling, cutting or by means of a casting process.

Another aspect of the invention provides a calibrating device for calibrating extruded profiles. The calibrating device comprises a plurality of the lamella blocks according to the invention, wherein the lamella blocks are arranged relative to each other to form a calibrating opening. The calibrating opening can essentially correspond to an outer contour of the profile to be calibrated (that has been extruded).

The calibrating device can comprise a plurality of activating devices, wherein each activating device is coupled with a respective lamella block, so as to individually activate each lamella block.

Another aspect of the present invention provides a method for manufacturing a lamella block according to the invention. The method for manufacturing the lamella block involves at least the step of manufacturing the lamella block by means of 3D printing or by means of additive manufacturing processes. The manufacture of the lamella block in a 3D printing process or additive manufacturing processes can here comprise the layer by layer laser sintering or laser melting of material layers, wherein the material layers are applied one after the other (sequentially) according to the shape of the lamella block to be generated.

The method can further involve the step of calculating a lamella block geometry (CAD data), and optionally of converting the 3D geometric data into corresponding control commands for 3D printing or additive manufacturing.

The method can involve manufacturing the lamella block as an integral component. However, it goes without saying that an alternative variant of the method can involve manufacturing each lamella individually (e.g., each with an abutting web element) and threading the lamellae along at least one carrier rod in the longitudinal direction of the lamella block.

Another aspect provides a method for manufacturing a lamella block that involves the following steps: Generating a dataset, which images the lamella block as described above, and storing the dataset on a storage device or a server. The method can further involve: Inputting the dataset into a processing device or a computer, which actuates an additive manufacturing device so that the latter fabricates the lamella block imaged in the dataset.

Another aspect provides a system for additively manufacturing a lamella block, with a dataset generating device for generating a dataset that images the lamella block described as above, a storage device for storing the dataset and a processing device for receiving the dataset and for actuating an additive manufacturing device in such a way that the latter fabricates the lamella block imaged in the dataset. The storage device can be a USB stick, a CD ROM, a DVD, a memory card or a hard disk. The processing device can be a computer, a server or a processor.

Another aspect provides a computer program or computer program product, comprising datasets, which while the datasets are being read in by a processing device or a computer, prompts the latter to actuate an additive manufacturing device in such a way that the additive manufacturing device fabricates the lamella block as described above.

Another aspect provides a computer-readable data carrier, which stores the computer program described above. The computer-readable data carrier can be a USB stick, a CD-ROM, a DVD, a memory card or a hard disk.

Another aspect provides a dataset, which images the lamella block as described above. The dataset can be stored on a computer-readable data carrier.

BRIEF DESCRIPTION OF THE DRAWINGS

Additional advantages, details and aspects of the present invention are discussed based on the drawings below. Shown on.

DESCRIPTION OF EXAMPLE EMBODIMENTS

FIGS. 1 to 4b were already discussed at the outset in conjunction with prior art. Let reference be made to the description there.

In conjunction with FIGS. 5a to 5c, an example of a lamella block 100 according to the invention for a calibrating device will now be described in more detail.

Figure 5A:
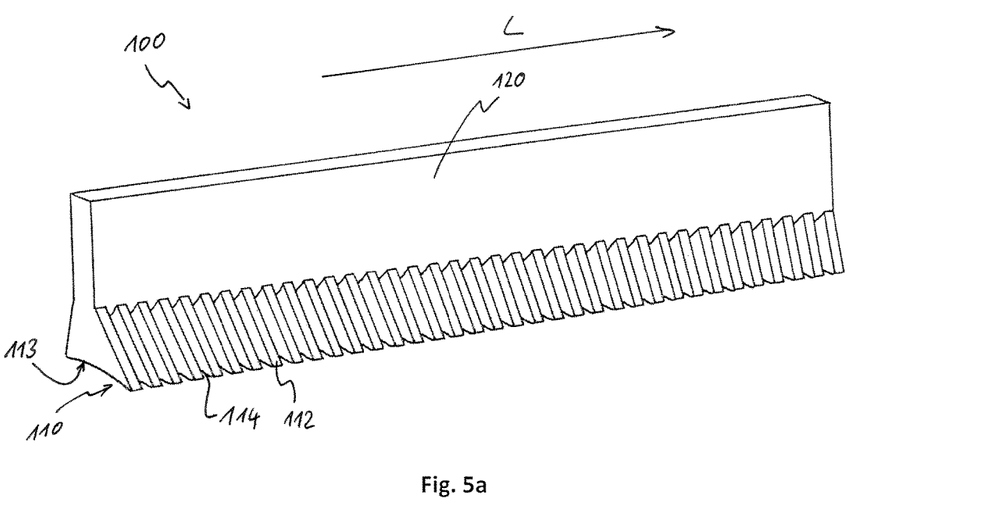
FIG. 5a-5c are views of a lamella block according to the present invention.

FIG. 5a shows a 3D view of a lamella block 100. The lamella block 100 comprises a carrier structure (back structure) 120 and a lamella structure 110. The carrier structure 120 acts as a carrier for the lamella structure 110.

The lamella block 100 can further have a coupling device (not shown on FIG. 5a). The coupling device is provided for coupling with an activating device of a calibrating device. The activating device is likewise not visible on FIG. 5a. According to one implementation, the coupling device can have two or more threaded holes spaced apart from each other. The threaded holes can be integrated into the carrier structure.

The carrier structure 120 is designed as a massive body. The carrier structure 120 has a rectangular profile in the cross section perpendicular to the longitudinal direction L. Instead of the massive configuration, the lamella block 100 can also have several carrier rods, to which the lamellae 112 are fastened (see FIG. 1).

The lamella structure 110 of the lamella block 100 according to the invention will now be described in more detail. The lamella structure 110 comprises a plurality of lamellae 112, which are spaced apart from each other in the longitudinal direction L of the lamella block 100. Neighboring lamellae 112 are separated from each other by corresponding grooves 114. In the embodiment shown on FIG. 5a, each lamella 112 has a triangular cross sectional profile relative to the longitudinal direction L. Each lamella 112 has a contact surface 113 on its side facing away from the carrier structure 120 (interior side). The contact surfaces 113 are defined by respective lateral lamella ends 116 of each lamella 112 in terms of their length (expansion transverse to the longitudinal direction L). The contact surfaces 13 of the lamellae 112 are those surfaces of the lamella structure 110 that come into contact with the outer surface of the profile to be calibrated during a calibration, and shape the latter. The contact surfaces 113 can preferably correspond with the contour of the profile to be calibrated. For example, the contact surfaces 113 can be slightly curved in design. The curvature of the contact surfaces 113 can be tailored to the outer surface (outer wall) of a pipe profile. Depending on the application, the contact surfaces 113 of the lamellae 112 can also be flat, or have some other type of curvature. Likewise, the lamella block 100 can also have a lamella shape that can deviate from the triangular shaped cross sectional profile described here.

The arrangement of the individual lamellae 112 within the lamella structure 110 will be described in more detail below. The lamellae 112 are arranged laterally offset to each other. This results in a fanned arrangement of the lamellae 112 in the longitudinal direction L of the carrier structure 120. If the lamella block is built into a calibrating device, the longitudinal direction L of the carrier structure 120 corresponds to the extruding direction (feeding direction) of the profile to be calibrated (that has been extruded). By laterally offsetting the lamellae 112 relative to each other, the lamellae ends 116 of the lamellae 112 of a lamella block 100 are made to run inclinedly relative to the feed direction of the profile, for example.

Figure 5B:
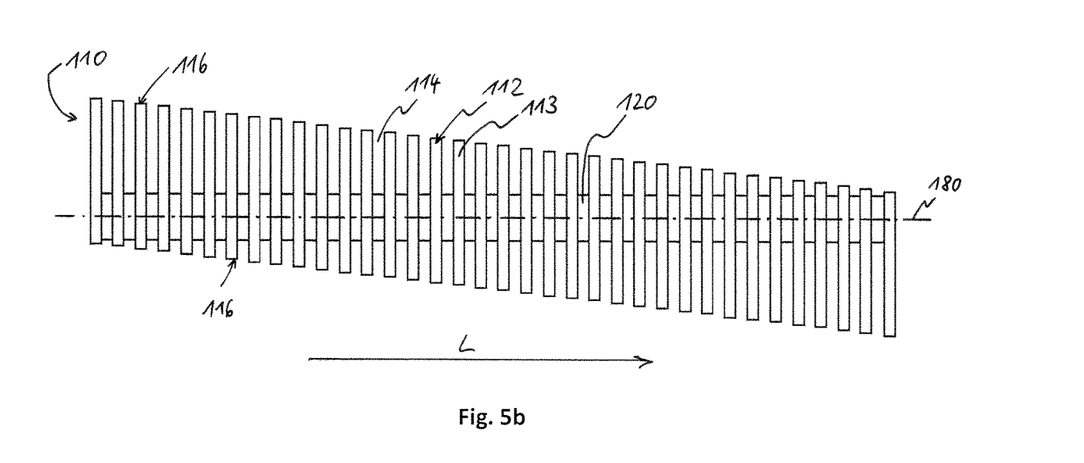

FIG. 5b shows a normal view of the inside of the lamella block 100 according to FIG. 5a. Offsetting the lamellae 112 relative to each other will now once again be described in greater detail based on FIG. 5b. As described above, each lamella 112 has a contact surface 113 on the inside of the lamella block 100. The contact surfaces 113 of the lamellae 112 can each be equally long (i.e., expanded transverse to the longitudinal direction L of the carrier structure). Alternatively, the contact surfaces 113 can also have varying lengths (each limited by the respective lamella ends 116). The lamellae 112 can be displaced relative to each other in such a way that the contact surfaces 113 describe a diagonal or inclined progression in relation to the longitudinal direction L of the carrier structure 120. Analogously, the respective lamella ends 116 also run diagonally or inclinedly relative to the longitudinal direction L of the carrier structure 120.

Figure 5C:
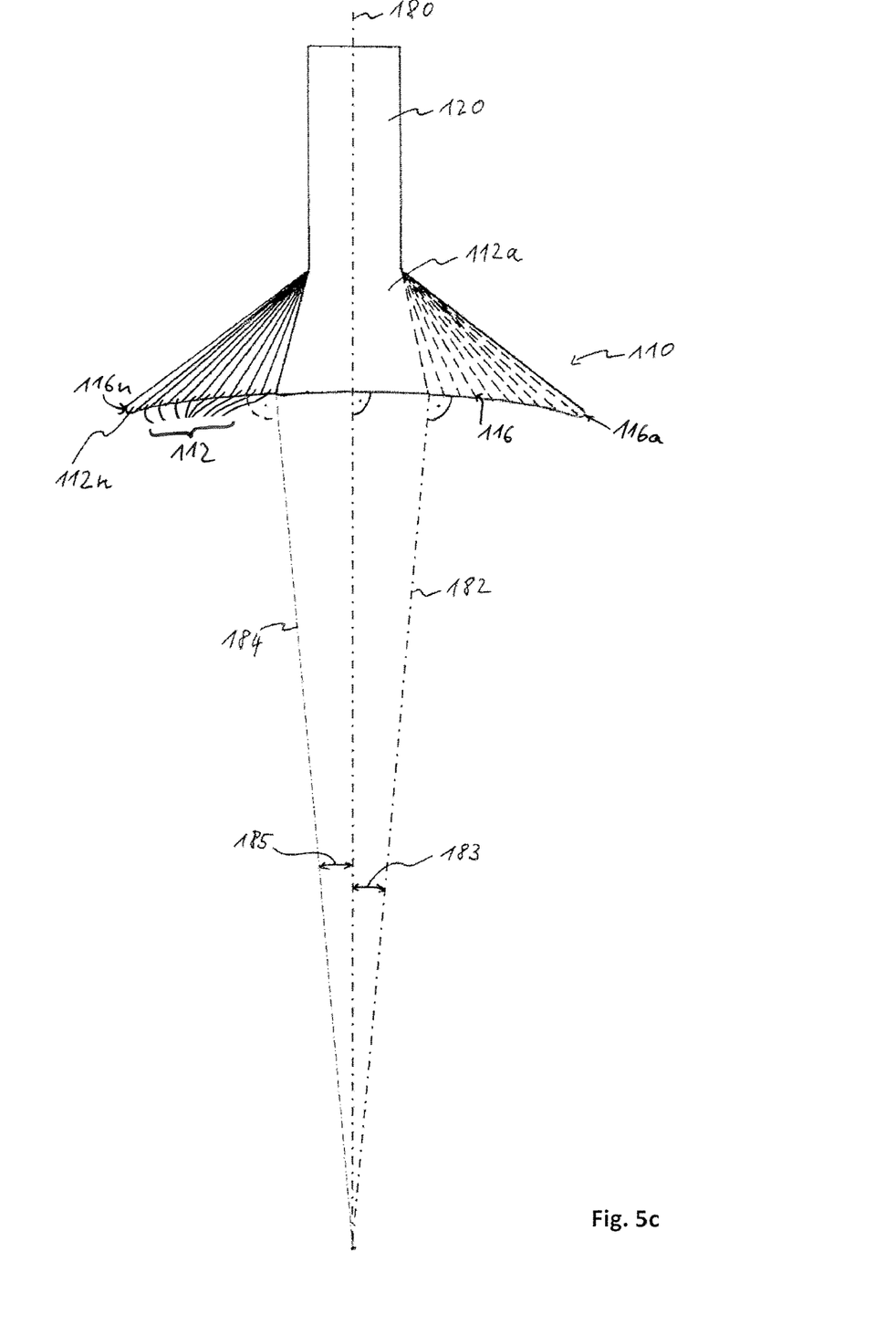

FIG. 5c shows a projection of the lamella block 100 depicted on FIGS. 5a and 5b transverse to the longitudinal direction L of the carrier structure 120 of the lamella block 100. How the lamellae 112 are offset or fanned relative to each other becomes visible from the perspective shown on FIG. 5c. The lamella block 100 has a first lamella 112a at its one (front) end, and a last lamella 112n at its other (rear) end. The lamella block 100 has a plurality of additional lamellae 112 in between. Let it be noted that the number of lamellae 112 selected on FIG. 5c is only exemplary, and, in order to provide a simplified illustration, does not correspond to the number of lamellae 112 according to FIGS. 5a and 5b. The lamella 112a along with at least several other of the lamellae 112, 112n have an asymmetrical cross section in relation to a plane of symmetry 180 of the lamella block 100. The plane of symmetry 180 of the lamella block 100 runs perpendicular to the contact surfaces 113 of the lamellae 112, and in a longitudinal direction L centrally through the carrier structure 120. The geometric configuration of the lamellae 112a, 112, 112n results in a fanning of lamellae 112a, 112, 112n relative to the longitudinal direction L of the carrier structure 120.

According to the variant shown on FIGS. 5a to 5c, the first lamella 112a is offset by the same amount as the last lamella 112n of the lamella block 100. The lateral offset can be determined by an angle 183, 185 between surface normals 182, 184 of the contact surface of the respective lamella 112a, 112n and the plane of symmetry 180. The surface normals 182, 184 are each centrally located on the respective contact surface.

Additional examples of lamella blocks according to the invention will be described in more detail below in conjunction with FIGS. 6 and 7.

Figure 6:
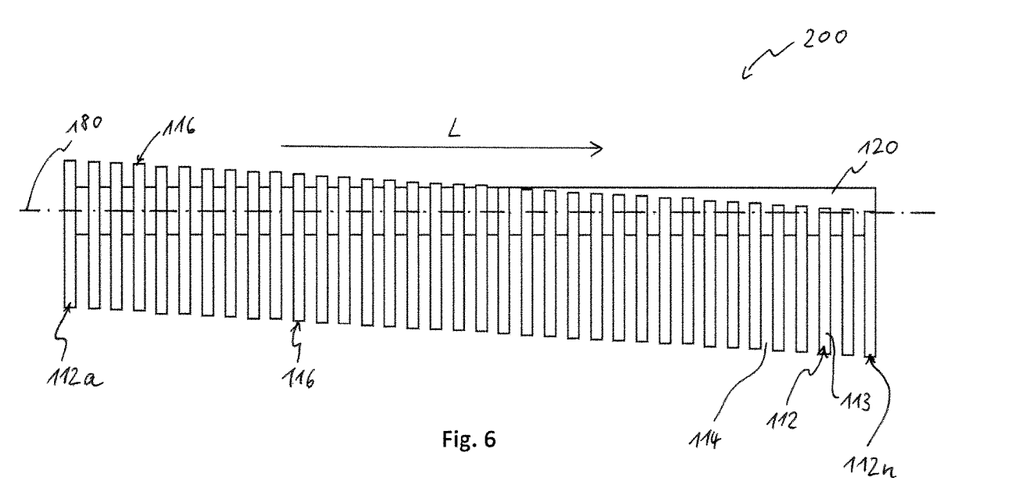
FIG. 6 is a view of another lamella block according to the present invention.

FIG. 6 shows a normal view of the inside of a lamella block 200 according to the invention. Just like the lamella block 100 according to FIGS. 5a to 5c, the lamella block 200 has a carrier structure 120 and a lamella structure 110. The lamella structure 110 comprises a plurality of lamellae 112, which are spaced apart from each other by grooves 114. Reference is made to the corresponding description above. For simplification purposes, those features of the lamella block 200 which are structurally and functionally similar or identical to features of the lamella block 100 were provided with the same reference numbers. The geometry of the contact surfaces 113 of the lamella block 200 can be the same as the geometry of the contact surfaces 113 of the lamella block 100. Alternatively, the geometry of the contact surfaces 113 of the lamella block 200 can differ from the contact surface geometry of the lamella block 100.

The lamella block 200 differs from the lamella block 100 in terms of how the lamellae 112 are arranged relative to the carrier structure 120. As opposed to the lamella block 100, the amount by which the first lamella 112a is laterally offset differs from the amount by which the last lamella 112n is laterally offset. Analogously to the variant according to FIGS. 5a to 5c, the respective lamella ends 116 of the lamella block 200 run inclinedly relative to the longitudinal direction L of the carrier structure 120.

Figure 7:
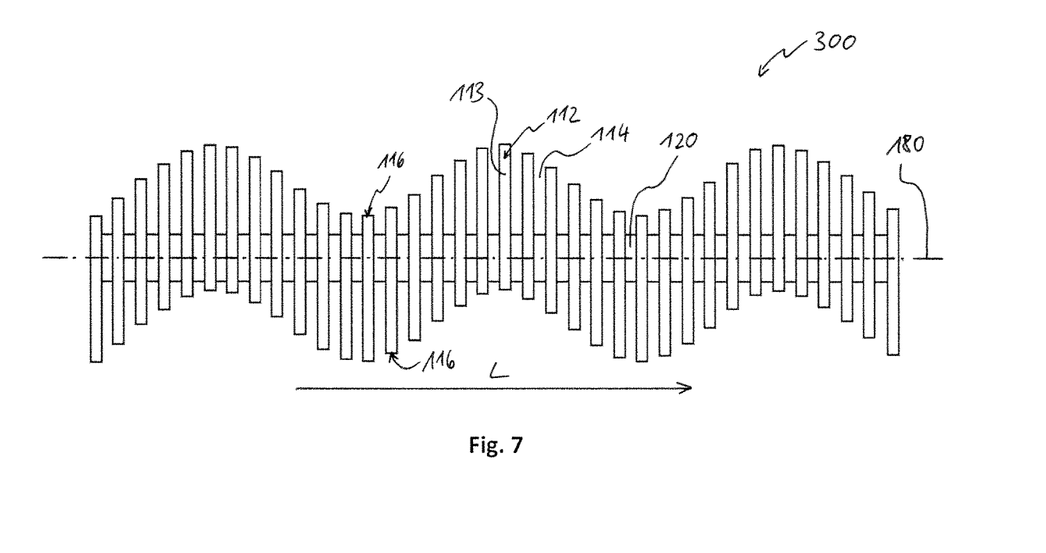
FIG. 7 is a view of yet another lamella block according to the present invention.

FIG. 7 shows another example of a lamella block 300 according to the invention. For simplification purposes, those features of the lamella block 200 which are structurally and functionally similar or identical to features of the lamella block 100 were once again provided with the same reference numbers. The lamella block 300 once again differs from the lamella blocks 100 and 200 in terms of how much the lamellae 112 are offset relative to each other. The contact surfaces 113 of the lamella block, and analogously the lamella ends 116, have a wavy progression in the longitudinal direction L of the carrier structure 120.

It goes without saying that the lamella blocks 100, 200, 300 shown on FIGS. 5a to 5c, as well as on FIGS. 6 and 7, are exemplary. Other variants in the geometric configuration of the lamellae 112 and/or in the arrangement of the lamellae on the carrier structure 120 are also conceivable. In particular, the contact surfaces 113 or the lamella ends 116 of a lamella block according to the present invention can also describe a zigzag or other kind of progression.

The carrier structure of each lamella block 100, 200, 300 of a calibrating device can run parallel to a central axis of the calibrating device (or in the feed direction of the profile). The arrangement of lamella blocks 100, 200, 300 relative to each other in a calibrating device essentially corresponds to the arrangement as described on FIG. 3 in conjunction with prior art. As opposed to prior art, however, the lamella ends of the lamella of each lamella block of a calibrating device according to the invention do not run along a straight line along the feed direction of the profile to be calibrated.

Specifically, according to the present invention, the lamellae of each lamella block of a calibrating device are offset relative to each other in such a way that the lamella ends of the lamellae of each of the lamella blocks 100, 200, 300 preferably run inclinedly and/or so as to define wavy or zigzag paths to the central axis of the calibrating device. As a consequence, it can be ensured that the tracks generated by the lamella ends on the outer surface (outer wall) of the profile to be calibrated are smoothed out or covered while being fed through the calibrating opening of the calibrating device. The calibrating basket need not be rotated for this purpose.

As further evident from FIGS. 5a to 5c, as well as 6 and 7, the carrier structure 120 of the lamella blocks 100, 200, 300 is integrally designed together with the lamella structure 110. A generative or additive manufacturing process can be used to achieve the geometry of the lamella blocks 100, 200, 300 described above. This type of manufacturing process is shown on FIG. 8, and will be described in more detail below.

Figure 8:
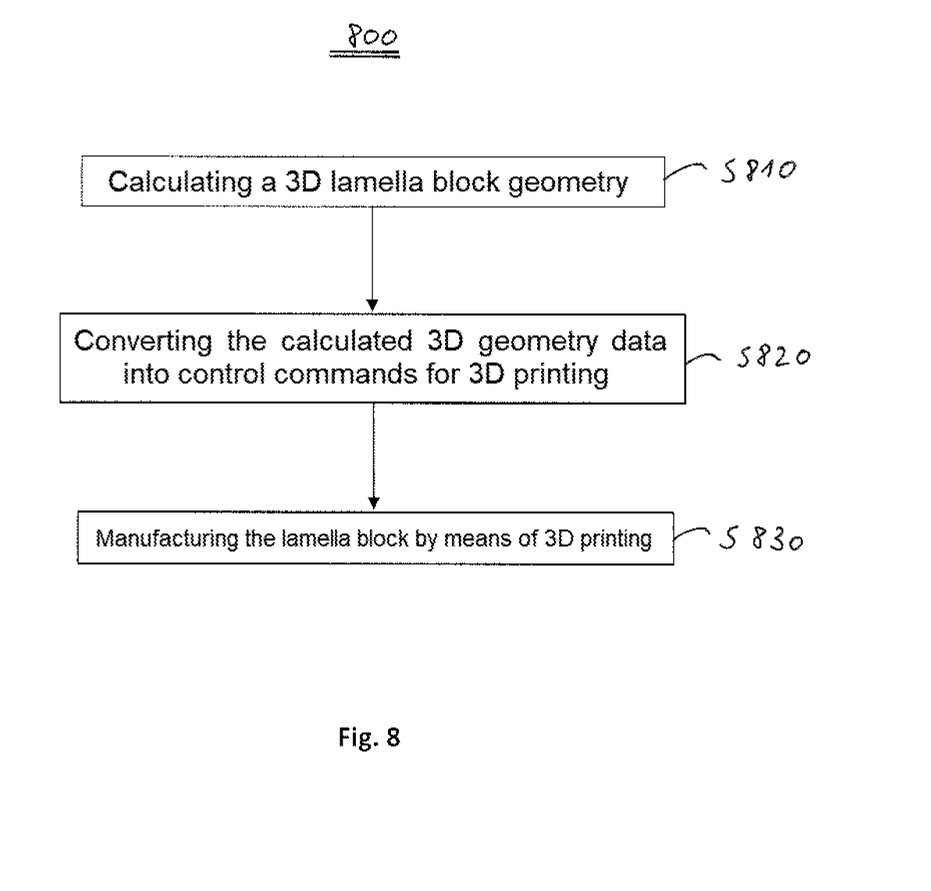
FIG. 8 is a flowchart of a method for manufacturing a lamella block according to the invention.

Use is thus made of a 3D printing process. In a first step S810, 3D geometry data (CAD data) are here calculated based upon the simulation described above, which simulates a suitable topology of the lamella structure 110. The 3D geometry data describe the geometry of the lamella block 100, 200, 300 (in particular the offset lamella arrangement). In a second step S820, the calculated 3D geometry data are converted into control commands for 3D printing. Based on the generated control commands, the lamella block 100, 200, 300 is then built up layer by layer in a third step S830 by means of a 3D printing process (e.g., laser sintering, laser melting). A metal material or a polymer material can be used as the material for 3D printing.

As an alternative to manufacturing via 3D printing, it is also conceivable that the lamella block 100, 200, 300 be manufactured out of a workpiece (for example through milling, drilling, cutting) or by means of a casting process. In another alternative, the lamellae 112 of a lamella block 100, 200, 300 according to the invention can be separately manufactured, and threaded along carrier rods analogously to the known embodiment depicted on FIG. 1, so as to produce the lamella block.

What is claimed is:

1. A lamella block for a calibrating device for calibrating an extruded profile, the lamella block comprising:
   a carrier structure having a body extending linearly between opposite first and second ends in a longitudinal direction thereof; and
   a lamella structure including a plurality of lamellae all formed integral with and extending outwards from the body, said plurality of lamellae being linearly arranged one behind another in the longitudinal direction of the body and being spaced apart from each other by grooves, wherein neighboring lamellae of the plurality of lamellae are arranged laterally offset to each other in the longitudinal direction, wherein each lamella of the plurality of lamellae has a contact surface on an interior side of the lamella block, wherein offsetting the lamellae relative to each other causes the contact surfaces of the lamellae to describe a diagonal or wavy progression in relation to the longitudinal direction of the body.

2. The lamella block according to claim 1, wherein each lamella has a cross section transverse to the longitudinal direction of the carrier structure, wherein the cross sections of at least some of the lamellae are inherently symmetrical.

3. The lamella block according to claim 1, wherein, in a state where the lamella block is built into a calibrating device, the longitudinal direction of the body corresponds to a feed direction of the extruded profile.

4. The lamella block according to claim 1, wherein the carrier structure and the lamellae are fabricated out of the same material or out of different materials.

5. The lamella block according to claim 1, wherein the lamella block is manufactured by means of 3D printing or by means of an additive manufacturing process.

6. The lamella block according to claim 1, wherein the body is a monolithic body.

7. The lamella block according to claim 1, wherein the body has a cross-sectional shape of a rectangle in a direction perpendicular to the longitudinal direction of the body.

* * * * *